March 4, 1941. A. G. BLANCHARD 2,233,395
SAFETY APPARATUS FOR BOILERS
Filed Oct. 14, 1935 5 Sheets-Sheet 1
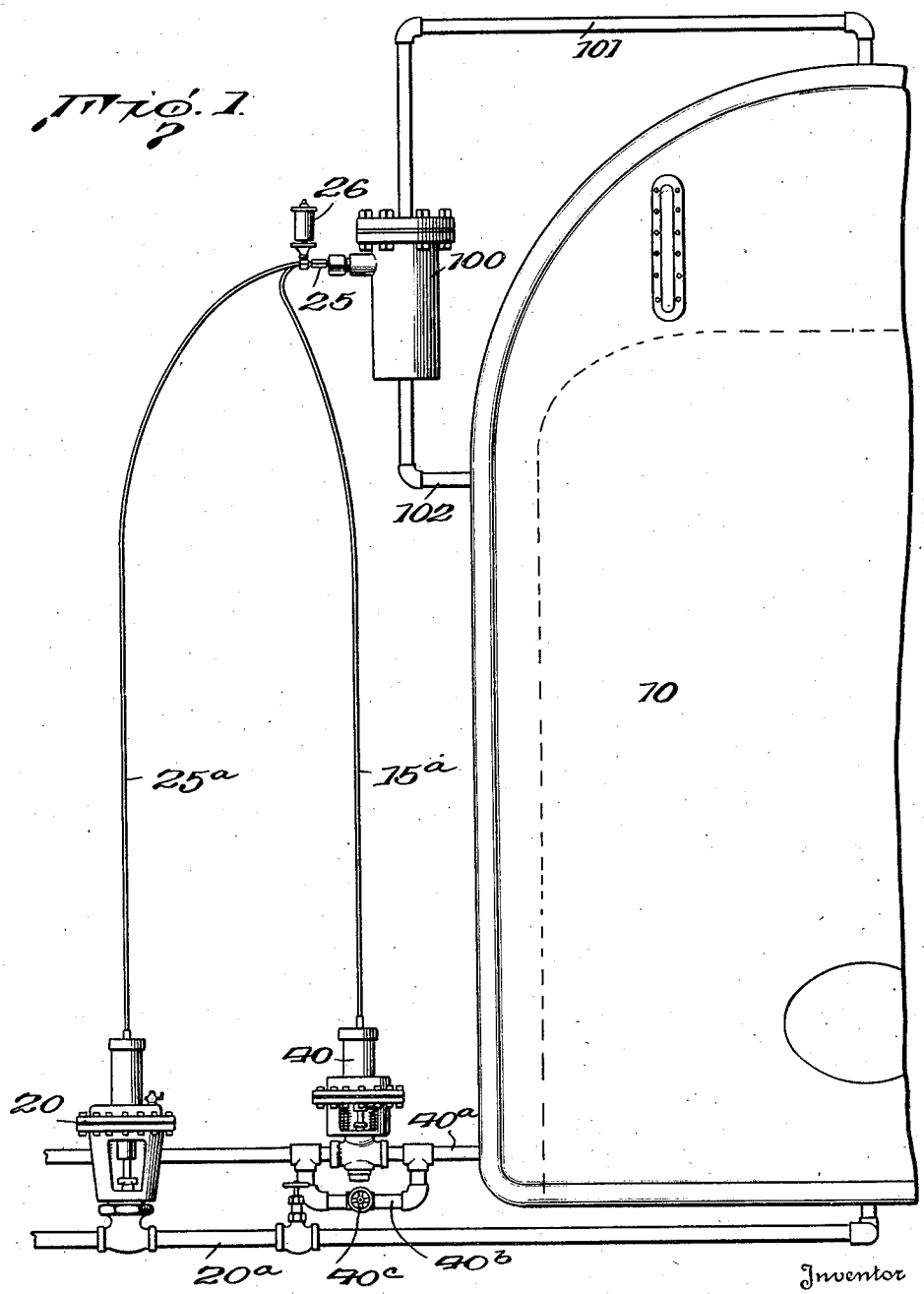
Inventor
Alva G. Blanchard
By Church & Church
His Attorneys

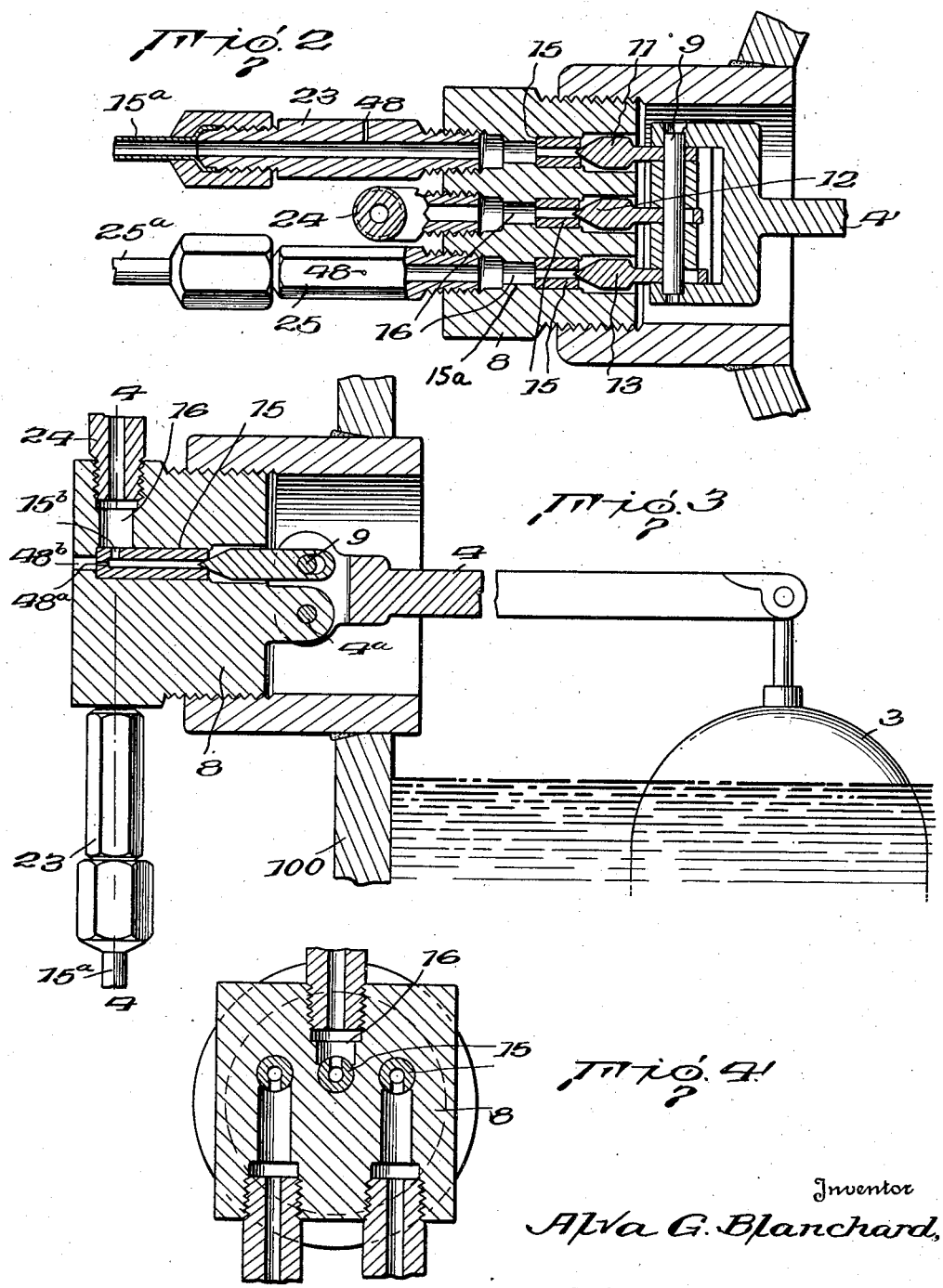

March 4, 1941.  A. G. BLANCHARD  2,233,395
SAFETY APPARATUS FOR BOILERS
Filed Oct. 14, 1935  5 Sheets-Sheet 3

Inventor
Alva G. Blanchard,
By Church & Church
His Attorneys

March 4, 1941. A. G. BLANCHARD 2,233,395
SAFETY APPARATUS FOR BOILERS
Filed Oct. 14, 1935 5 Sheets-Sheet 4

Inventor
Alva G. Blanchard,
By Church & Church
His Attorneys

March 4, 1941.   A. G. BLANCHARD   2,233,395
SAFETY APPARATUS FOR BOILERS
Filed Oct. 14, 1935   5 Sheets-Sheet 5
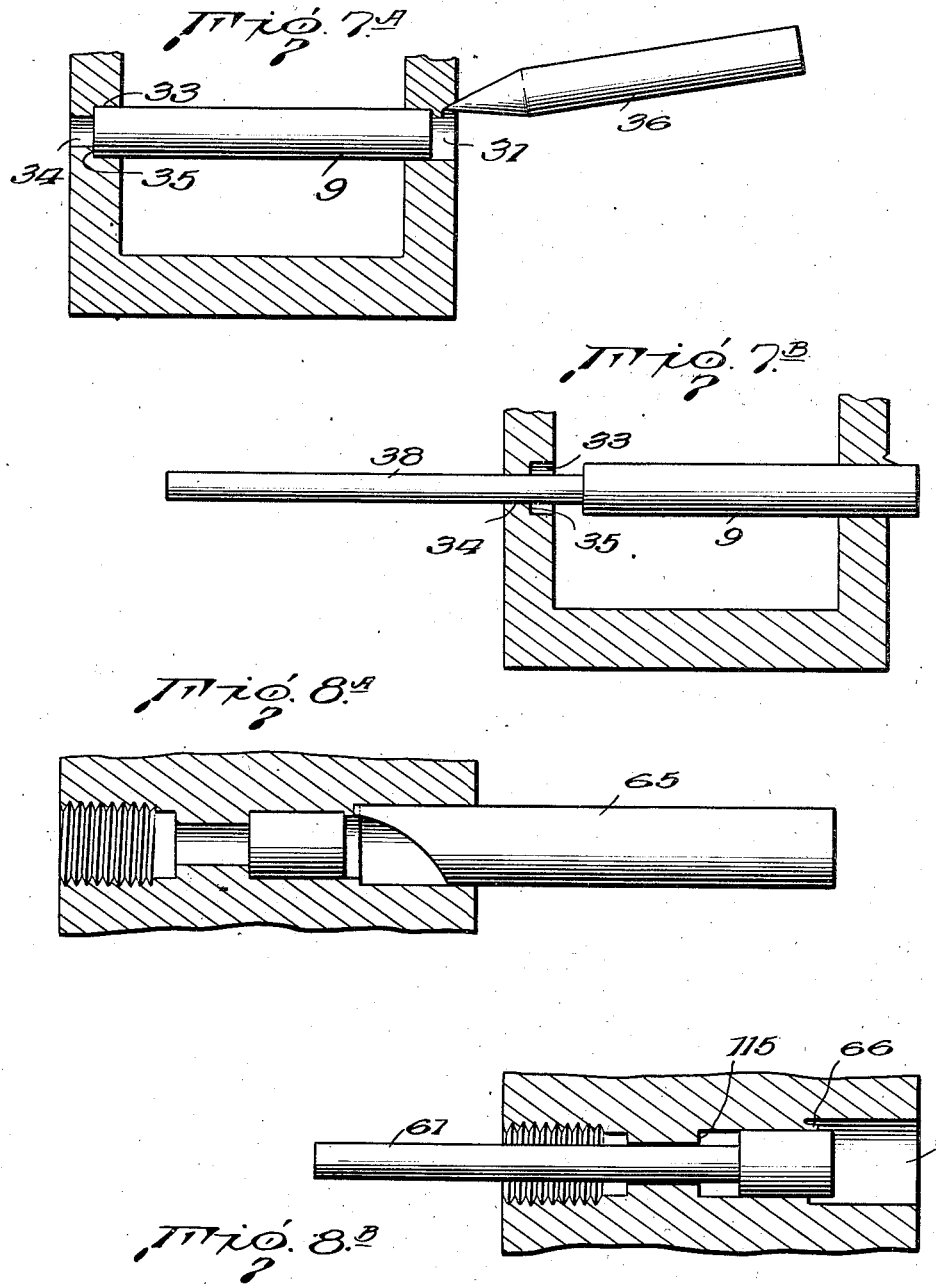

Patented Mar. 4, 1941

2,233,395

UNITED STATES PATENT OFFICE 2,233,395

SAFETY APPARATUS FOR BOILERS

Alva G. Blanchard, Shreveport, La.

Application October 14, 1935, Serial No. 44,988

3 Claims. (Cl. 122—504)

This invention relates to improvements in safety devices for boilers.

One object of the invention is to provide automatic means for maintaining the water level in boilers within certain specified maximum and minimum limits.

Another object is to provide automatic means for giving a warning signal to the boiler attendant or fireman in the event the automatic means for regulating the water level should become inoperative and the water level drop to a level approaching what might be defined as the danger point.

A still further object is to provide a safety device comprising automatically operated means for cutting off the fuel supply (to gas-fired boilers) in case the warning signal and the water supply, where both of the latter are automatically controlled, should become inoperable, or if the signal should be disregarded by the attendant, these automatic fuel cut-off means being operable at a time when the water level has receded to a dangerously low point.

A still further object is to provide means for regulating the operation of any or all of the safety devices, above mentioned, i. e., the water supply; the fuel supply; and the signal, by means responsive to variations in the water level in the boiler. More specifically, this feature of the invention comprises a master control unit adapted to contain a body of fluid whose surface corresponds to the water level in the boiler and in which there is supported a float for controlling the operation of the safety devices above mentioned.

Another object is the provision of a safety apparatus for boilers wherein the safety devices are actuated by fluid pressure, preferably by steam from the boiler itself.

Still another object is the provision of means in a safety apparatus of this character wherein the successive operation of the various safety devices can be timed and varied at will.

Another object contemplates the provision of a novel assembly and method of assembly of certain of the structural parts of the apparatus, such as the valve seats in the ports of the master unit and the mounting of the valves for said seats, whereby the assembly, retention and extraction of certain structural elements are greatly facilitated.

With these and other objects in view, the invention consists in certain details of construction and combinations and arrangements of parts, all as will hereinafter be more fully described and the novel features thereof particularly pointd out in the appended claims.

In the accompanying drawings illustrating a preferred embodiment of the invention—

Figure 1 is an elevational view illustrating, more or less diagrammatically, a boiler with the master control unit, the warning signal device, and the connections for controlling the valves of the fuel and water supply conduits;

Fig. 2 is a horizontal sectional view through the float-operated master control unit, illustrating the master control valves and seats therefor;

Fig. 3 is a vertical sectional view through the master control unit, but illustrating a modified form of valve seat construction;

Fig. 4 is a transverse vertical section on the line 4—4 of Fig. 3;

Figs. 7A and 7B are vertical sectional views illustrating, more or less diagrammatically, the assembly and extraction of the pin which carries the control valves of the master control unit; and Figs. 8A and 8B illustrate, diagrammatically, the installation and removal of the valve seats for the control valves of the master control unit.

Figure 5:
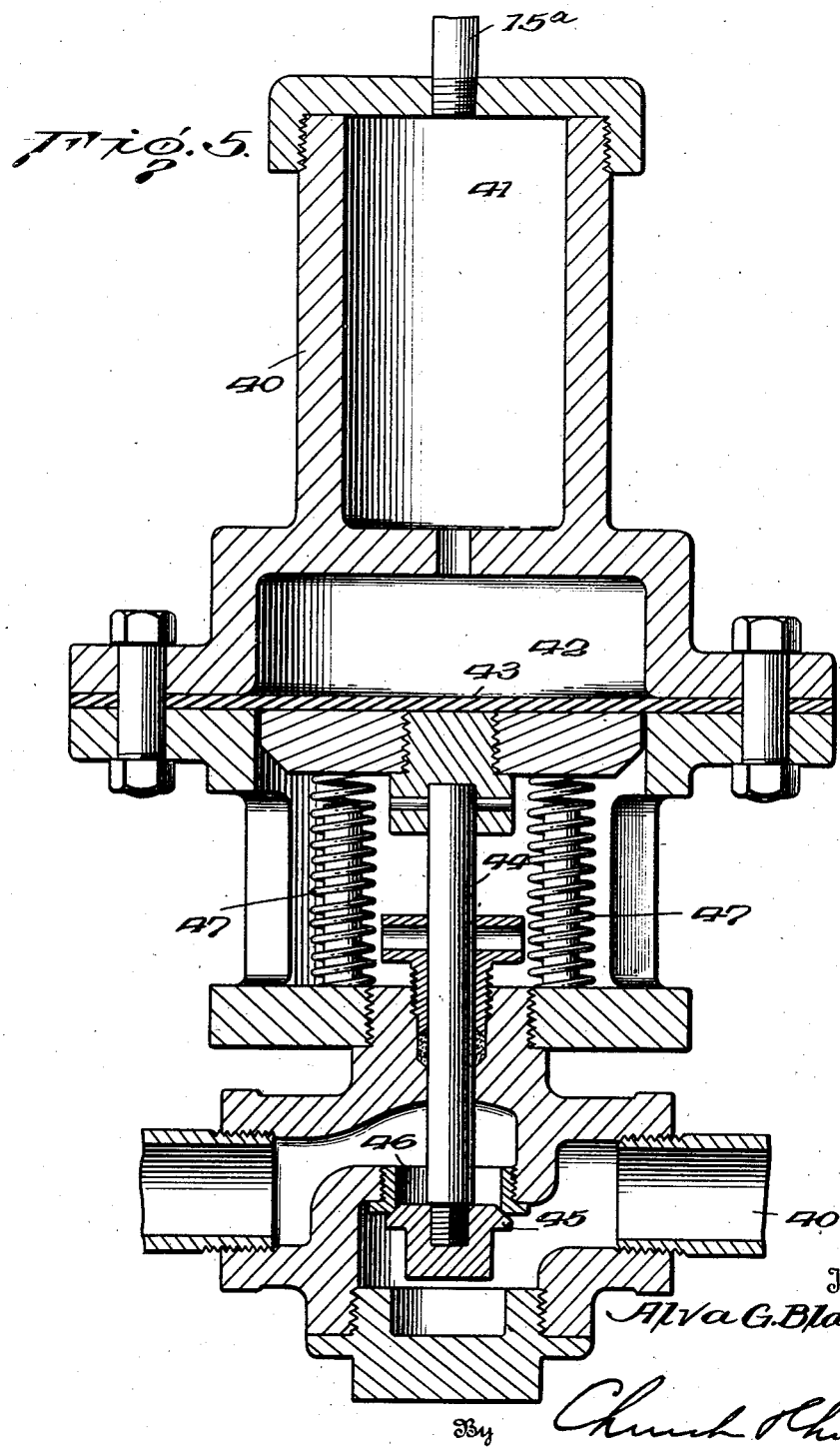
Fig. 5 is a vertical sectional view through the control valve for the water supply conduit of the boiler.

The boiler 10, illustrated more or less diagrammatically in Fig. 1, has associated therewith the master control unit 100, the upper portion of said unit being connected by a pipe 101 to the steam chamber of the boiler and by pipe 102 to the water chamber of the boiler. Connected to said master control unit 100, by means to be more specifically described hereinafter, is a warning signal, preferably an audible signal in the form of a whistle 26; a valve-actuating mechanism 20 for operating a valve in the fuel supply conduit 20a; and a valve-operating mechanism 40 for the valve in water supply line 40a. It will be understood this fuel control means is applicable only to boiler constructions wherein gas is used as fuel. It will also be appreciated that, while the level of the water in the boiler is to be controlled through the water supply conduit 40a, other means may be utilized for initially supplying water to the boiler or, if desired, a by-pass 40b having a manually controlled valve 40c therein may be provided in the supply line 40a.

In the apparatus contemplated by the present invention, it is proposed that, after the initial supply of water has been placed in the boiler and the manually controlled valve 40c closed, the further supply of water will be controlled automatically to maintain the water level in the boiler within certain maximum and minimum levels, and if the water should recede to a point below a predetermined level by reason of the failure of the automatic water control then, and in that event, the signal 26 will be operated to warn the attendant, who can then see that the proper supply of water is fed to the boiler. Also, in the event of both the automatic water control and the signal failing, or the attendant failing to heed the warning given by the signal, the master control unit will operate to shut off the fuel supply upon the water level in the boiler receding still further and approaching too nearly the danger zone or point.

The various instrumentalities will now be described in detail. Referring to Figs. 2 and 3, the master control unit 100 is partially filled with water from the boiler through connection 102 and the upper portion of said unit is filled with steam from the boiler through connection 101. Supported in the side wall of the master unit is a valve body 8 having a series of ports or passages 16 therein and in each port or passage there is a valve seat 15 for a series of valves indicated at 11, 12 and 13. The stems of said valves are connected to a pin 9 carried in the arms of a bifurcated lever 4 pivoted on a pin 4a in the valve body 8. Suspended from the end of lever 4 is a float 3 supported in the body of water within the master control casing. As will be apparent, recession of the water level in the master unit chamber will cause lever 4 to be rocked and retract the valves 11, 12 and 13 from their seats 15. However, by having a rather neat fit between valve 11 and pin 9 and elongating the opening in the stem of valve 12 through which pin 9 extends and by making the aperture in the stem of valve 13 still longer, the valve 11 will first be unseated; then valve 12 will be unseated; and, finally, valve 13 will be unseated, provided, of course, that the recession of the water level in chamber 100 progresses to a point where the lever 4 will be rocked to take up all of the play allowed by the elongation of the slot in the stem of valve 13. At this point, it should be mentioned that the master control unit is preferably positioned at an elevation where the water level therein will correspond to the water level in the boiler.

Referring to Figs. 2 and 5, a fitting 23 threaded into the port 16 controlled by valve 11 has its outer end connected to a pipe line 15a which, in turn, leads to a chamber 41 in the casing of the water supply valve control mechanism 40. Chamber 41 communicates with a lower chamber 42 in which there is a diaphragm 43, and connected to said diaphragm is the stem 44 of valve 45 for the port 46 in the water supply conduit. Valve 45 is yieldingly held closed by springs 47 but, in the event the water level in the boiler should recede to a point where float 3 and lever 4 will be lowered sufficiently to unseat valve 11, steam from the upper portion of the master control unit will flow through port 16, fitting 23 and pipe line 15a, into chambers 41, 42, of casing 40 and deflect the diaphragm 43 downwardly with the result that valve 45 will be unseated. The valve being opened, water will then be supplied to the boiler through supply line 40a until the level of the water in the boiler and in the master control unit rises sufficiently to move the float 3 and lever 4 upwardly to close valve 11.

Connected to the second passage 16 in valve body 8 is a fitting 24 which, in turn, is connected to a signal, such as the whistle 26, and, in the event there should be a failure in the automatic operation of valve 45 or should, for some other reason, the supply of water through conduit 40a fail, continued recession of the water level in the boiler and master control unit will cause valve 12 to be unseated, with the result that steam issuing through this port 16 and fitting 24 will sound the whistle and give warning to the attendant of the depletion of water in the boiler to a dangerous level.

Figure 6:
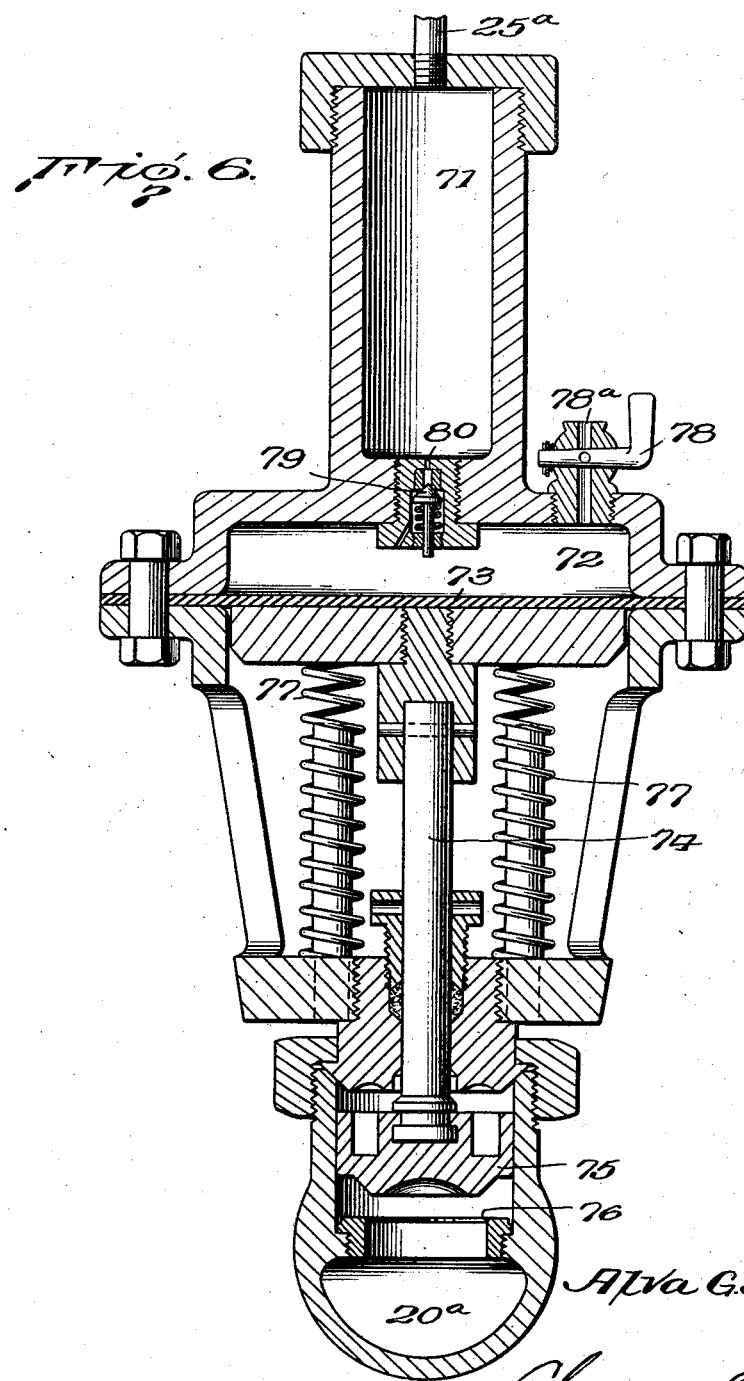
Fig. 6 is a vertical sectional view through the fuel cut-off valve of the fuel supply conduit.

The third passage 16 in the valve body 8 is provided with a fitting 25 which is connected by pipe line 25a to the valve-actuating mechanism shown in Fig. 6 for the gas or fuel supply line. This valve-actuating mechanism comprises an upper chamber 71 communicating with a lower chamber 72 through a port 80 in which there is a check control valve 79. A diaphragm 73 in lower chamber 72 is connected to the upper extremity of the stem 74 of a valve 75 adapted to cooperate with the valve seat 76 in the fuel supply conduit 20a. In this instance, valve 75 is normally yieldingly held open by springs 77 but, should the water leved in the boiler recede below the point where the valve 45 in the water supply conduit will be opened, as above described, and beyond the point where the whistle 26 will be sounded, then, in that event, valve 13 in the master control unit will be opened and steam will pass through pipe line 25a into upper chamber 71 and lower chamber 72, with the result that diaphragm 73 will be flexed downwardly and valve 75 closed, thus shutting off the supply of fuel to the boiler. In order to insure against premature opening of valve 75 after it has once been closed in this fashion, the pressure built up in chamber 72 will be retained therein by reason of the presence of check valve 79 in passage 80 and, before the valve 75 can be opened, the attendant must relieve the pressure in chamber 72. This can only be done manually by manipulation of a valve 78 controlling a vent opening 78a in the wall of chamber 72. In other words, once the automatic mechanism for cutting off the supply of fuel has been placed in operation, the fuel line cannot be opened up automatically, but must be done manually by the attendant who would, of course, ascertain that boiler conditions had been restored to normal before again cutting on the fuel.

It will be observed that fittings 23 and 25 leading from the valve body 8 are provided with rather minute vents 48. The purpose of the vent in fitting 23 is to relieve the pressure on diaphragm 43 after the water level in the boiler has risen to a point where valve 11 will return to its seat. Likewise, the vent in fitting 25 insures against any leakage past valve 13 building up pressure in line 25a such as will operate the fuel cut-off at an improper time.

Described generally, the operation of the safety features is as follows: Assuming all three valves 11, 12 and 13 to be closed, upon recession of the water level, control valve 11 in the master unit will be opened when the water level is lowered to a certain point. Under normal conditions, this would cause the valve 45 in the water supply conduit to be opened and the water in the boiler replenished. If, however, there is a failure of the water supply and the water level in the boiler continues to recede, at a certain point control valve 12 in the master unit will be opened, thus sounding the warning signal. If, perchance, the attendant is not present or fails to respond to the warning and the water level continues to recede, then, when it reaches a still lower point, control valve 13 of the master unit will be opened and the valve 75 in the fuel supply line will be closed, thus shutting down the boiler and, as pointed out, the boiler cannot again be placed in operation until the attendant has manually relieved the pressure in chamber 72 of the fuel valve control unit. Also, as previously explained, if the water should be replenished, upon the opening of valve 45 in the water supply conduit, control valve 11 will be closed when the water level rises to normal, and then the pressure on diaphragm 43 of the water valve control mechanism will be relieved through the vent 48 in fitting 23 and the springs 47 will gradually return valve 45 to its closed position.

It will be appreciated that, by varying the length of the slots in the stems of the control valves in the master unit, the sequence in which the valves are operated or the time element involved in the successive operation of the several valves, can be regulated as desired. Also, preferably, the chambers 41, 42, in the water valve control mechanism 40 and the chambers 71, 72, in casing 70 of the mechanism for operating the fuel valve, are kept full of water to protect the diaphragms from the high temperature of the steam and the water added from time to time by condensation of steam may ultimately fill the pipe lines 15a, 25a, up to the vents 48 in the fittings 23, 25. In this way, pressure is actually exerted on the diaphragms 43 and 73 by the water, the water serving to transmit the pressures built up by the steam supplied through the ports 16 in the valve body 8 when the control valves 11, 12 and/or 13 are opened.

To facilitate installation and renewal of the valve seats 15 in valve body 8, the passages 16 are formed with a minor and a major cross-section, and the valve seat 15 is positioned between these two portions of each passage against a shoulder formed in that portion of the passage which is of minor cross-section. As shown in Fig. 2 each passage is formed with a shoulder 15a in its portion of minor cross-section at one end of the valve seat member which abuts against said shoulder. Adjacent the opposite end of the valve seat member, the inner wall of the passage of major cross-section is up-set at a plurality of circumferentially spaced points, the up-set portions bearing against this last-mentioned end of the valve seat member to retain said member in the passage. However, a portion of the valve seat member is exposed in the portion of the passage 16 of minor cross-section and, by inserting a tool 61 (see Fig. 8B) in the reduced portion of passage 16, and applying sufficient pressure to the valve seat member, the up-set portions indicated at 66 will be severed or bent back and the valve seat member pressed out of the passage. The upsetting of the metal for the purpose of securing the valve seat member in the passage may be accomplished by the tool 65, as indicated in Fig. 8A, and by merely upsetting the metal at circumferentially spaced points, the metal can be up-set at different points each time a valve seat member is renewed.

This same method of assembly and renewal may be employed in connection with the pin 9 which is supported in the bifurcated portion of lever 4 and which carries the control valves 11, 12 and 13. For instance, as illustrated in Figs. 7A and 7B, the arms of the lever are provided with openings for the pin. Opening 31 in one arm of the lever is of a cross-section corresponding to the pin 9, but the opening in the other arm is formed with a major cross-section 33 and with a minor cross-section 34, which forms a shoulder 35 at the point at which these two portions merge. In assembling these elements of the mechanism, the pin 9 is inserted through opening 31 until its end engages against shoulder 35 in the other arm. The metal in the wall of opening 31 is then up-set at circumferentially spaced points as by a tool 36, thus securing the pin in place. To remove the pin, it is only necessary to insert a tool 38 in the reduced opening 34 against the end of pin 9 which was seated against shoulder 35 and by applying sufficient pressure to the tool and pin, the offset portions of metal in opening 31 are severed or deflected and the pin 9 pressed out. A new pin can then be inserted and secured in place by upsetting fresh portions of metal in the wall of opening 31.

Referring to Figs. 3 and 4, there is shown a modified arrangement of valve seat members for the control valves 11, 12 and 13. In this instance, the passages 16 in valve body 8 are formed with offset portions which emerge from the upper and lower faces of the valve body. The valve seat members 15 are made somewhat longer and the bore of each member communicates through a lateral opening 15b with the ports or passages 16. The ends of the valve members 15 are also provided with longitudinally extending vent openings of reduced cross-section, these vents indicated at 48a discharging into openings 48b in the valve body 8. This construction eliminates the necessity of vents 48 in fittings 23, 25, of the previously described construction. At the same time, the valve seat members 15 can be assembled or displaced for renewal just the same as the valve seat members of the preferred construction.

What I claim is:

1. In a safety apparatus for boilers, the combination of a fuel supply conduit, a valve in said conduit, means for yieldingly holding said valve open, a compartment, a diaphragm, a protective liquid for said diaphragm in said compartment connections between said diaphragm and valve, means for supplying fluid under pressure to said compartment for flexing said diaphragm and moving said valve to closed position, and manually operable means for relieving the fluid pressure on said diaphragm.

2. In a safety apparatus for boilers, the combination of a fuel supply conduit, a valve in said conduit, means for yieldingly holding said valve open, a compartment, a pressure responsive means to respond to pressure in said compartment arranged to close the valve, means for supplying fluid under pressure to said compartment to force said fluid against the pressure responsive means, and non-return means to prevent back flow of fluid from said compartment to said supply, and manually operable means to relieve the fluid pressure in said compartment.

3. In a safety apparatus for boilers, the combination of a fuel supply conduit, a valve in said conduit, means for yieldingly holding said valve open, a compartment, a pressure responsive means to respond to pressure in said compartment arranged to close the valve, means for supplying fluid under pressure to said compartment to force said fluid against the pressure responsive means, and non-return means to prevent back flow of fluid from said compartment, and manually operable means to relieve the fluid presure in said compartment and thereby open the valve.

ALVA G. BLANCHARD.